US011518104B2

(12) United States Patent
Fornos et al.

(10) Patent No.: US 11,518,104 B2
(45) Date of Patent: Dec. 6, 2022

(54) MANUFACTURING BOUNDARY OBJECT SHELLS

(71) Applicant: HEWLETT-PACKARD DEVELOPMENT COMPANY, L.P., Houston, TX (US)

(72) Inventors: Pol Fornos, Sant Cugat del Valles (ES); Luis Garcia, Sant Cugat del Valles (ES); Jun Zeng, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1123 days.

(21) Appl. No.: 16/075,677

(22) PCT Filed: Mar. 29, 2017

(86) PCT No.: PCT/US2017/024709
§ 371 (c)(1),
(2) Date: Aug. 6, 2018

(87) PCT Pub. No.: WO2018/182589
PCT Pub. Date: Oct. 4, 2018

(65) Prior Publication Data
US 2021/0197479 A1    Jul. 1, 2021

(51) Int. Cl.
*B29C 64/386* (2017.01)
*B33Y 50/00* (2015.01)
(Continued)

(52) U.S. Cl.
CPC ............ *B29C 64/386* (2017.08); *B33Y 50/00* (2014.12); *G01N 25/00* (2013.01); *G05B 19/042* (2013.01);
(Continued)

(58) Field of Classification Search
CPC ....... B29C 64/386; B33Y 50/00; G06F 30/10; G06F 2119/08; G01N 25/00
See application file for complete search history.

(56) References Cited

U.S. PATENT DOCUMENTS

| | | | |
|---|---|---|---|
| 8,730,240 B2 | 5/2014 | Wang et al. | |
| 2014/0002498 A1 | 1/2014 | Lee et al. | |

(Continued)

FOREIGN PATENT DOCUMENTS

| | | | |
|---|---|---|---|
| CN | 101268690 A | 9/2008 | |
| CN | 105492981 A | 4/2016 | |

(Continued)

OTHER PUBLICATIONS

Peng (Peng, W., Jiguo, S., Shiqing, Z., & Gang, W. (2016). Control of wire transfer behaviors in hot wire laser welding. The International Journal of Advanced Manufacturing Technology, 83(9-12), 2091-2100.) (Year: 2016).*

*Primary Examiner* — Bijan Mapar
(74) *Attorney, Agent, or Firm* — HP Inc. Patent Department (57) ABSTRACT

In an example, a method includes receiving, at a processor, object model data representing at least a portion of an object to be generated by an additive manufacturing apparatus by fusing build material. Using a processor and from the object model data, a property diffusion model for the object in object generation may be determined. Using a processor and based on the property diffusion model, a manufacturing boundary object shell around the object and encompassing an external volume may be determined. The shell may have a variable thickness determined so as to include build material for which, in generation of the object, the property modelled in the property diffusion model has a value which is predicted to conform to a predetermined parameter.

14 Claims, 3 Drawing Sheets

(51) Int. Cl.
*G06F 30/10* (2020.01)
*G05B 19/042* (2006.01)
*G01N 25/00* (2006.01)
*G06F 119/08* (2020.01)

(52) U.S. Cl.
CPC .... *G06F 30/10* (2020.01); *G05B 2219/49023* (2013.01); *G06F 2119/08* (2020.01)

(56) References Cited

U.S. PATENT DOCUMENTS

| | | |
|---|---|---|
| 2015/0276379 A1 | 10/2015 | Ni et al. |
| 2016/0107380 A1 | 4/2016 | Smoot et al. |
| 2016/0167297 A1 | 6/2016 | Donaldson |
| 2016/0303807 A1 | 10/2016 | Diamante |
| 2016/0332376 A1* | 11/2016 | Ramirez Muela ..... B33Y 70/00 |
| 2017/0015065 A1 | 1/2017 | Potter et al. |

FOREIGN PATENT DOCUMENTS

| | | |
|---|---|---|
| WO | WO-2015108556 A1 | 7/2015 |
| WO | 2016022336 A2 | 2/2016 |
| WO | 2016033045 A1 | 3/2016 |
| WO | 2016072966 A1 | 5/2016 |
| WO | 2016123740 A1 | 8/2016 |
| WO | WO-2016140670 A1 | 9/2016 |
| WO | WO-2016195665 A1 | 12/2016 |

* cited by examiner

MANUFACTURING BOUNDARY OBJECT SHELLS

BACKGROUND

Additive manufacturing techniques may generate a three-dimensional object through the solidification of a build material, for example on a layer-by-layer basis. In examples of such techniques, build material may be supplied in a layer-wise manner and the solidification method includes heating the layers of build material to cause melting in selected regions. In other techniques, chemical solidification methods may be used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. A coloring agent, for example comprising a dye or colorant, may in some examples be used as a fusing agent or a coalescence modifier agent, and/or as a print agent to provide a particular color for the object. Print agents may control or influence other physical or appearance properties, such as strength, resilience, conductivity, transparency, surface texture or the like.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

In some examples set out herein, it may be intended to generate a number of objects in a single, common, build process. This may for example increase the throughput of an additive manufacturing apparatus and increase energy efficiency.

In such examples, the arrangement of the objects in a fabrication chamber should be considered. For example, considering thermal management, where a single object is to be generated, a fusing agent may be applied which results in a general warming of the print bed material when the print bed is irradiated. If a second object is manufactured nearby, this can cause additional heating of the build material between the first and second object, which may increase the temperature to fusing temperature. If the objects are too close, this may cause them to stick together. In other examples, the thermal diffusion of one object may cause overheating of a neighbouring object, which could for example impair mechanical properties such as strength, resilience or the like, or appearance properties such as surface texture, the sharpness of edge features, color, clarity or the like.

Thus while increasing the number of objects which are generated in a common build process can increase efficiency, if objects are manufactured too close to one another, object quality may be adversely affected. Dense packing of objects within a fabrication chamber may therefore reduce object yield (i.e. the number of objects which meet quality specifications) unless care is taken to maintain sufficient spacing therebetween.

In some examples, a "new object" may be defined comprising all objects to be generated at once. Defining such an object is complicated and demanding on computing resources. Moreover, any change to the composition of the objects being generated together, or their relative placement, will result in the "new object" model being obsolete. In other examples, a cuboid boundary box may be defined around an object having at least a minimum distance from the object at all points. However, this can lead to areas of the additive manufacturing chamber which could be utilised being left unused. In still further examples, a shell of standard thickness could be defined around the object. This may reduce the amount of under-utilised space, but does not provide optimal packing density.

Figure 1:
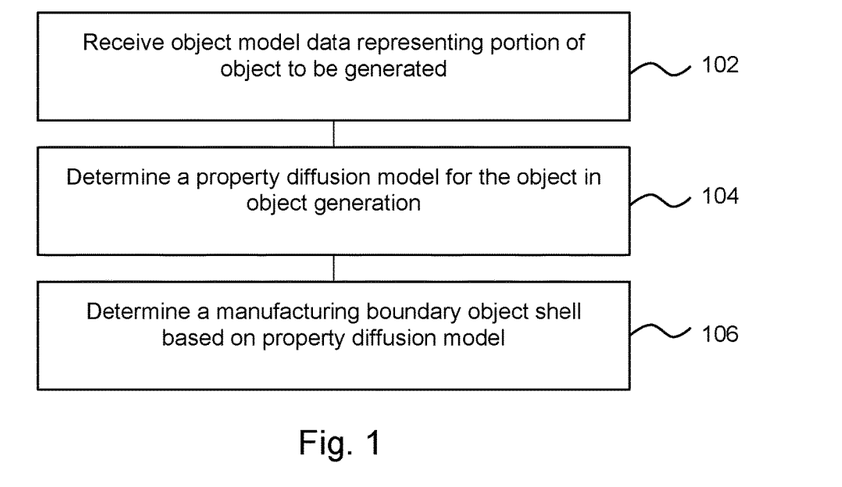
FIG. 1 is an example method for determining a manufacturing boundary object shell for additive manufacturing.

FIG. 1 is an example of a method, which may be a computer implemented method, and/or a method of determining a manufacturing boundary object shell. Block 102 comprises receiving, at a processor, object model data representing at least a portion of an object to be generated by an additive manufacturing apparatus by fusing build material. The object model data may for example comprise a Computer Aided Design (CAD) model, and/or may for example be a STereoLithographic (STL) data file. In some examples, an object portion may comprise a layer of an object, for example a layer to be formed in a layer-by-layer manufacturing process such as additive manufacturing.

Block 104 comprises determining, using a processor and from the object model data, a property diffusion model for the object in object generation. This may model the diffusion of an object property into the build material around the object. For example, the property may comprise an object generation temperature. In generation of an object, there may be a thermal diffusion which heats the build material around the object. The temperatures reached in the vicinity of the object during object generation may be associated with the solid volume of the object: generally, larger object portions which are formed by applying a larger volume of fusing agent may become hotter, and thus heat a larger region of the surrounding build material than smaller object portions. By basing the property diffusion model on the object model data, this may be taken into account. The heat may decrease with distance from the object, for example according to a predetermined diffusion function which may depend on the thermal properties of the build material, print agents, temperatures reached, and the like.

In other examples, the property may be another object property, which may for example be associated with a print agent. For example, a colored or conductive print agent may be provided. This may, for example by capillary action, disperse into the surrounding build material. For example, a region of build material around the object may become 'stained' with a color, or rendered conductive. Diffusion may be greater in regions of the build material which contain greater amounts of such print agents. Again, such properties may decline with distance from the object.

In some examples, the property diffusion model may be determined conservatively, for example so as include a 'safety factor', or so as to represent an extreme or 'worst case' scenario for diffusion of a property, where the property is predicted so as to diffuse further into the surrounding build material than may be case in the majority of real-life examples. As the diffusion behaviour may depend on the type of print agent and/or build material used in object generation, in some examples, the method may comprise determining an indication of a build material and/or print agents or print agent combinations and selecting a diffusion function or the parameters of a diffusion function based on the indication. For example, use of a fusion reduction agent may have a cooling effect on the build material around an object, and this could be taken into account. In addition, the heat absorption and heat conduction of different build materials and/or print agents may differ. In other examples, the energy source may be considered when determining or applying a diffusion function.

Block 106 comprises determining, using a processor and based on the property diffusion model, a manufacturing boundary object shell around the object and encompassing an external volume (where external means external to the object, i.e. not a solid part of the object, and which may include a volume within an object cavity). The manufacturing boundary object shell has a variable thickness determined so as to include build material for which, in generation of the object, the property modelled in the property diffusion model has a value which is predicted to conform to at least one predetermined parameter. For example this may be a threshold value, or a value range. The shell may define a 'forbidden area' in which no other object should be generated in generation of a plurality of objects in a common build operation (i.e. act as a boundary for that object for use in manufacture). The shell may formed around any object boundary (i.e. the object surfaces). For example, an interior surface of an object (defining a cavity or the like) may be encapsulated in a shell, and/or the shell may itself contain a cavity.

Blocks 104 and 106 may be carried out by the same or by different processors.

In an example, the property may be object temperature and the parameter may be a particular temperature or temperature range. For example, an 'isotherm' around the object may be determined, at which the temperature of the build material surrounding the object is predicted to have (in some examples, at most) a certain value. The isotherm may represent a temperature at which, even if another object was manufactured at the isotherm, there is a sufficient distance between the object such that adverse effects associated with overheating of one object by another may not occur. In other examples, the shell may be determined on the basis that all objects to be generated in a common object generation process will have a similar associated shell. In some examples, the temperature value (or other property parameter) which determines the boundary of the shell may be the same for all such shells (e.g. the shells may be defined using an isotherm of a common value for all objects to be generated together). In some examples, the shell may be determined such that, at the boundary of the shell, the effect of the presence of the object on the build material substantially zero (for example, the build material will be substantially at room temperature, or substantially un-colored by build material, or have a conductivity which is unaffected by the object generation, or the like). In other examples, the parameter(s) may comprise a color change value, a conductivity value, or some other value indicative of a property.

In some examples, determining the manufacturing boundary object shell may comprise determining the manufacturing boundary object shell to have at least a threshold thickness. For example, this may be to guard against wear and tear or to ease post processing or the like. There are various ways in which this may be implemented. For example, it may be determined whether a shell based just on the property diffusion model has at least a minimum thickness at each point and, if not, the method may comprise increasing the thickness to the minimum thickness. In another example, the manufacturing boundary object shell may be determined by assigning the largest of a predetermined minimum thickness or a thickness determined based on the property diffusion model or the like at each surface point. In a further example, a transformation of a shell of minimum thickness may be carried out based on the property diffusion model.

In some examples, a plurality of properties may be considered and the shell may be defined such that all properties meet predetermined parameters. For example, such a shell may be a 'superset' of the set of shells for the plurality of properties and their associated parameters such that at each point the shell has a thickness indicative of a property which meets the associated parameter(s) at point which is, for all the properties considered and their relevant parameters, furthest from the object. For example, a thin object portion may not result in much thermal diffusion but may be strongly colored. The potentially negative effect of the color may extend further into the build material surrounding the object than the potentially negative effect of the temperature. Thus color diffusion may define the thickness of the shell around part of the object. However, another object portion may be thicker and thus associated with a higher thermal diffusion and thermal diffusion may define the thickness of the shell around that object portion.

In some examples, the object model data may be modified so as to include data representing the shell. In other examples a representation of the shell may be generated as a separate data object.

Figure 2:
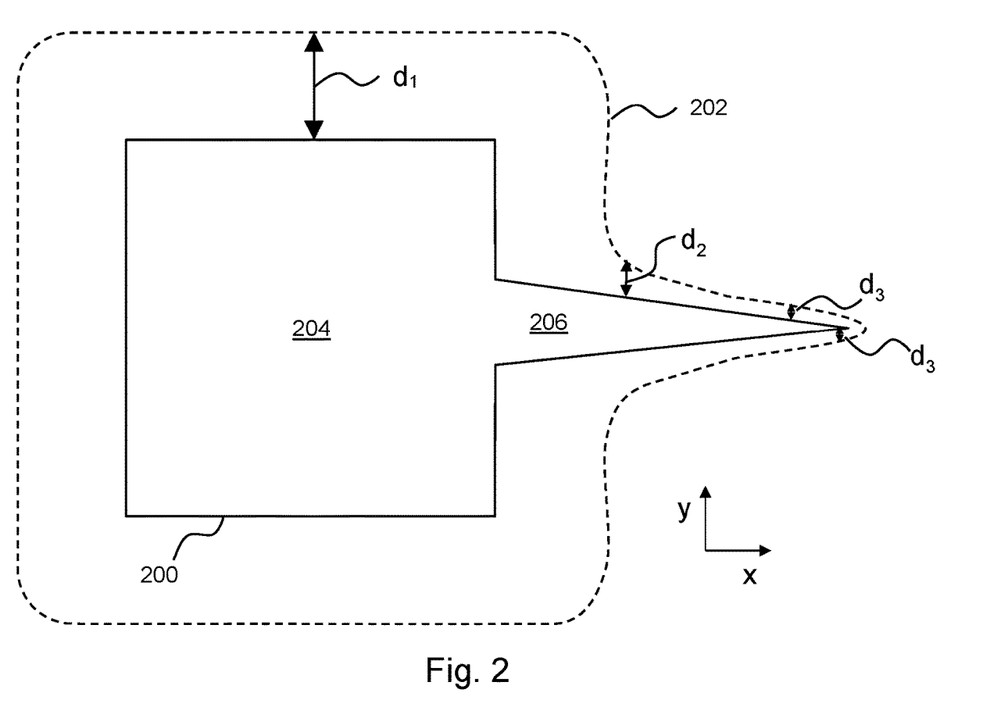
FIG. 2 is an example of an object and an associated a manufacturing boundary object shell.

FIG. 2 shows an example of an object 200 (shown in cross section) surrounded by a manufacturing boundary object shell 202. The object 200 has a first portion 204 of a first xy cross sectional area and a second portion 206 of a generally smaller xy cross sectional area which tapers to a point. The figure may be thought of as representing a 2D slice of an object to be generated in layers in the z dimension in xyz 3D space.

In this case, the shell 202 is determined based on a thermal diffusion model in which it is assumed that the build material surrounding the object is at least initially at an ambient temperature. The thermal diffusion model in this example may be determined by predicting the surface temperature for the object during generation at a plurality of locations across the surface. The surface temperature of the first portion 204 may generally be higher than the surface temperature of the second portion 206: the surface temperature may for example be determined for a point on surface by considering that each unit volume which is within a radius of that surface point contributes heat to the unit volume depending on its temperature and its distance. Therefore, as the unit volumes within the first portion 204 may tend to be hotter, and/or there may be more of them contributing to the surface temperature, the surface temperature of the first portion 204 may generally be higher that the surface temperature of the second portion 206. This assumes that fusing agent is applied to a layer of build material at a predetermined area coverage (for example, x drops per $cm^2$), although this need not be the case and where coverage is variable, the coverage may also be considered in the property diffusion model.

The thermal diffusion model then applies a temperature gradient to the surface temperatures to predict an isothermal boundary (which may include a safety factor), and uses this boundary to define the shell 202. For example, the temperature gradient may be determined using an inverse-sigma curve, and the outer boundary of the shell 202 in this example is an isothermal surface determined based on that curve. The parameters of the inverse-sigma curve based on at least the build material, and in some examples, the print agent and/or heat source.

As can be seen, the shell 202 has a first thickness $d_1$ in the vicinity of first portion 204 and a second thickness $d_2$ in the vicinity of the second portion 206, where the first thickness $d_1$ is greater than the second thickness $d_2$. As the second portion 206 tapers to a point, the thickness decreases until it reaches a third thickness $d_3$, which in this example is a threshold minimum thickness. The shell 202 has at least the third thickness $d_3$ at all locations round the object 200.

In other examples, the thermal diffusion may be determined based on, for example, the contribution of each unit volume to each other unit volume, or in some other way.

In examples where the shell 202 is determined based on another property, a different diffusion model may be used. For example, an alpha blending function may be used to predict the diffusion of color, which may be based on the concentration of the color at the object surface. Such diffusion models may be determined analytically or experimentally.

Figure 3:
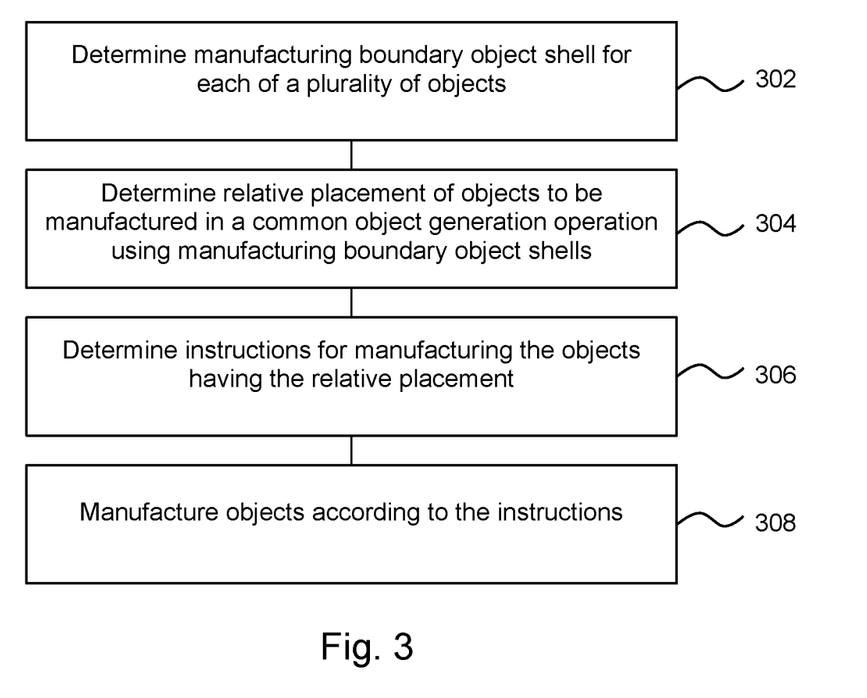
FIG. 3 is an example method of object generation.

FIG. 3 is an example of a method which may be a method for manufacturing a plurality of objects in a common object generation operation.

Block 302 comprises determining a manufacturing boundary object shell for each of a plurality of objects to be manufactured in a common object generation operation. For example, this may be determined based on any of the techniques discussed above. In some examples, the property parameter(s) used to determine the thickness of the shells may be the same for all such shells.

In block 304, the relative placement of the objects is determined using the manufacturing boundary object shells. The placement of the objects (i.e. their intended positions within a fabrication chamber) may be determined so as to maximise object density within a fabrication chamber without overlap between the object shells. Viewed another way, the shells may be 'close packed' within the volume of a fabrication chamber. The relative placement may be determined by solving a 'packing problem' based on the shells. Packing problems may be addressed using a range of techniques and for example using a processing apparatus such as a computer or the like. Increasing the object 'nesting' density may increase the number of objects while ensuring that the number of fabricated objects which meet quality criteria, which may be referred to as object 'yeild', is not unduly adversely affected.

For example, the shells may be defined using a common temperature value to define an isothermal boundary for the shell (noting that the shell may comprise a concavity, or a cavity, for example if the object comprises a hollow interior). In effect, this defines a wrapper of build material around the object boundary (which would usually remain unfused, and/or free of print agent) at which the build material is likely to reach a higher temperature than the isothermal temperature of the outer boundary. The thickness of the shell may for example be determined such that shell boundary may be at, or close to, the ambient temperature of untreated build material. In such examples, defining the shell as an excluded zone in which no other object may be generated means that the existence of each object within the fabrication chamber has a negligible thermal impact on any other object. It may be noted that, if all shells are defined to have a common isothermal outer boundary, the objects may be generated according to a packing solution in which their respective shells would 'touch' (noting that shells are a tool to determine spacing rather than physical objects) and there will be no heat transfer between the two as they are at the same temperature.

As has been mentioned above, in some examples, the object model data may be modified so as to include a representation of the shell. In other examples, the shell may be described in a separate data object (i.e. the shell may be 'empty' of the object). In some examples, the shell may be generated by a first processor and the relative placement of the objects are determined by a second processor. In such cases, just the shell may be provided to the processor carrying out block 304, which may help to maintain the confidentiality of the object to be generated. In addition, this may reduce the data provided to, or processed by the processor. In other examples, the same processor may be used to perform both blocks 302 and 304.

Block 306 comprises determining instructions for manufacturing the objects so as to have, in manufacture, the relative positions. This provides a closely packed batch of objects which may be manufactured efficiently and make good use of the available manufacturing volume without risk that the properties of one object adversely affect a neighbouring object. Such instructions may be determined based just on the object model data (and not data representing the shell) once the relative positions have been determined.

Block 308 comprises manufacturing objects according to the instructions. This may for example comprise generating the objects in layer-wise manner by selectively solidifying portions of layers of build materials. The selective solidification may in some examples be achieved by selectively applying print agents, for example through use of 'inkjet' liquid distribution technologies, and applying energy, for example heat, to the layer.

Such methods may allow a closer packing of object portions than assigning a shell of consistent thickness, or a cuboid enclosing the object, which may for example be interleaved in a more compact manner as a result of the method.

Figure 4:
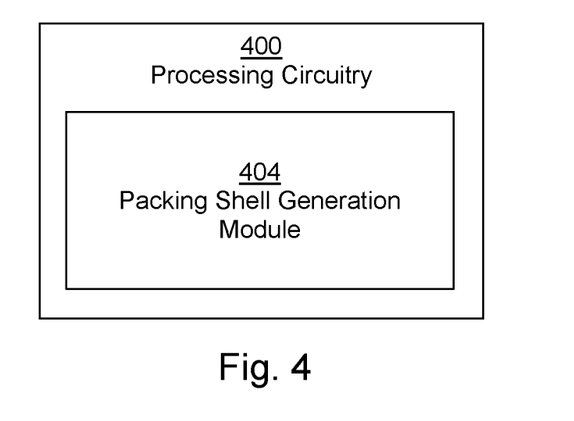
FIG. 4 is a simplified schematic drawing of an example of a processing apparatus for processing data for additive manufacturing.

FIG. 4 is an example of a processing circuitry 400 comprising a packing shell generation module 402.

The packing shell generation module 402 determines an object shell around an object to be generated in additive manufacturing based on a predicted property diffusion of the object to be generated, wherein the predicted property diffusion is determined from a property parameter model indicative of predicted parameters of the object during object generation. The object shell may surround the surfaces of an object (which may comprise inner surfaces as well as outer surfaces in some examples) and encompass an external volume. The diffusion may be a diffusion into build material surrounding the object. The object shell may for example comprise a manufacturing boundary object shell as described above. The diffusion may be determined using a property diffusion model determined based on the property parameter model.

In some examples, the packing shell generation module 402 is operable to determine an object shell having at least a threshold thickness. This may be to ease post processing handling specifications. The packing shell generation module 402 may in some examples be operable to determine the object shell based on a predetermined property parameter function (which may for example be a decay function, or any other predetermined property parameter gradient) associated with at least one property associated with a print agent and/or build material to be applied during object generation. For example, the packing shell generation module 402 may be operable to determine the object shell based on a predetermined thermal diffusion function, such as a thermal gradient associated with a particular build material for use in generating the object (i.e. the predicted property diffusion is a thermal diffusion and is determined using a diffusion function). In some examples, such a function may be determined experimentally, or may be modelled based on predetermined properties of the materials used.

Figure 5:
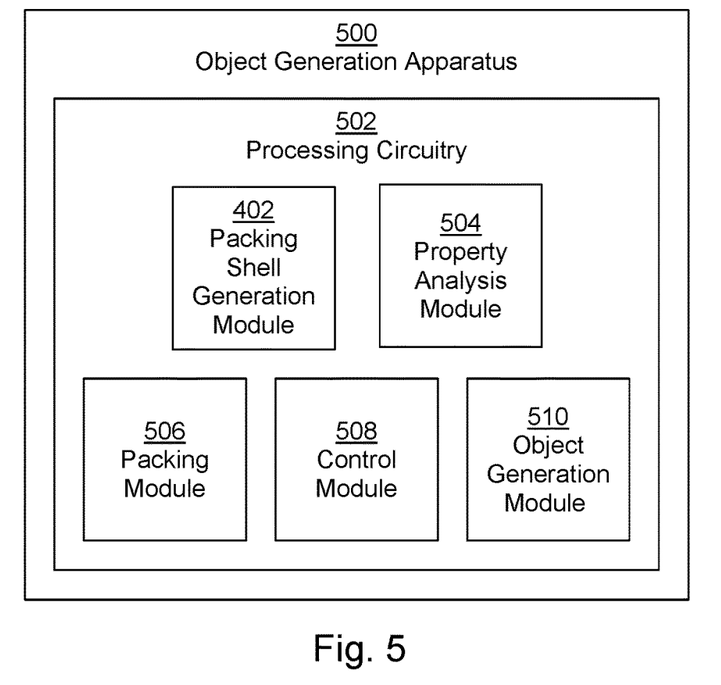
FIG. 5 is a simplified schematic drawing of an example additive manufacturing apparatus.

FIG. 5 is an example of object generation apparatus 500 comprising processing circuitry 502. The processing circuitry 502 comprises, in addition to the packing shell generation module 402 described above, a property analysis module 504; a packing module 506, a control module 508 and an object generation module 510.

The property analysis module 504, in use of the processing circuitry 400, analyses object model data representing an object to be generated by the additive manufacturing apparatus 500 and generates a property parameter model indicative of predicted parameters of the object during object generation. For example, this may comprise surface temperatures, or colors, or conductivity or the like. In some examples, the property analysis module 504 is operable to generate a temperature distribution model indicative of predicted object surface temperatures.

The packing module 506 is operable to determine a close packed relative placement of a plurality of objects having object shells such that the shells do not overlap. Such a close packed relative placement may be intended to minimise the unoccupied volume within a fabrication chamber (i.e. the volume within a fabrication chamber in which no object is generated).

The control module 508 is operable to determine control instructions to generate the plurality of objects having the relative placement determined by the packing module 506. The object generation module 510 is operable to control the object generation apparatus 500 to generate the plurality of objects according to the instructions.

In this example, the processing circuitry 502 is provided within object generation apparatus 500, although in other example, some or all the components thereof may be provided separately.

The object generation apparatus 500 may generate the objects in layer-wise manner by selectively solidifying portions of layers of build materials. The selective solidification may in some examples be achieved by selectively applying print agents, for example through use of 'inkjet' liquid distribution technologies, and applying energy, for example heat, to each layer. The object generation apparatus 500 may comprise additional components not shown herein, for example a fabrication chamber, a print bed, a print head for distributing print agents, a build material distribution system for providing layers of build material, energy sources such as heat lamps and the like.

In another example, the object generation apparatus 500 may comprise the processing circuitry 400 of FIG. 4.

Figure 6:
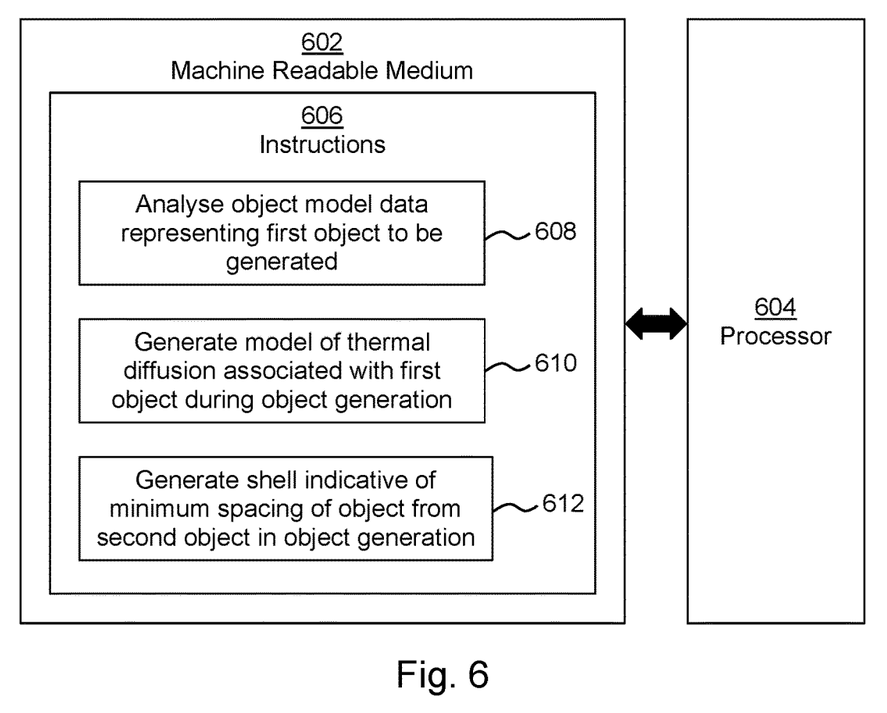
FIG. 6 is an example machine readable medium associated with a processor.

FIG. 6 shows a machine readable medium 602 associated with a processor 604. The machine readable medium 602 comprises instructions 606 which, when executed by the processor 604, cause the processor 604 to perform processing actions. The instructions 606 comprise instructions 608 to cause the processor 604 to analyse object model data representing a first object to be generated by an additive manufacturing apparatus, instructions 610 to cause the processor 604 to generate a model of a thermal diffusion associated with the first object during object generation; and instructions 612 to cause the processor 604 to, using the thermal diffusion model, generate a shell at least partially indicative of an intended minimum spacing of the object from a second object in object generation. The shell may be indicative of an intended minimum spacing from another object shell (i.e. minimum spacing between the objects may be indicated by more than one shell). The shell may have a variable thickness.

In some examples, the machine readable medium 602 comprises instructions 606 to carry out at least one of, or combinations of, the blocks described above in relation to FIG. 1 or FIG. 3.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some flows and/or blocks in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus functional modules of the apparatus (such as the processing circuitry 400, 502, the packing shell generation module 402, the property analysis module 504, the packing module 506, the control module 508 and/or the object generation module 510) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims, in any combination.

The invention claimed is:

1. A method comprising:
receiving, at a processor, object model data representing at least a portion of an object to be generated by an additive manufacturing apparatus by fusing build material;
determining, using a processor and from the object model data, a property diffusion model for the object in object generation;
determining, using a processor and based on the property diffusion model, a manufacturing boundary object shell around the object and encompassing an external volume, the manufacturing boundary object shell having a variable thickness determined so as to include build material for which, in generation of the object, a property modelled in the property diffusion model has a value which is predicted to conform to a predetermined parameter; and
using the manufacturing boundary object shell in determining, using a processor, a relative placement of a plurality of unconnected objects to be manufactured in a common object generation operation.

2. The method of claim 1 in which determining the manufacturing boundary object shell further comprises determining the manufacturing boundary object shell to have at least a threshold thickness.

3. The method of claim 1 in which a manufacturing boundary object shell is determined for each of the plurality of unconnected objects and the relative placement of the plurality of unconnected objects is determined so as to maximise object density without overlap between the manufacturing boundary object shells.

4. The method of claim 1 further comprising determining instructions for manufacturing the plurality of unconnected objects so as to have, in manufacture, the relative placement; and
manufacturing the plurality of unconnected objects according to the instructions.

5. The method of claim 1 in which:
determining the property diffusion model comprises determining a thermal diffusion model for at least a portion of the object during object generation; and
determining the manufacturing boundary object shell comprises determining an isothermal surface encompassing the object.

6. Processing circuitry comprising:
a processor configured to determine an object shell around an object to be generated in additive manufacturing based on a predicted property diffusion of the object to be generated, wherein the predicted property diffusion is determined from a property parameter model indicative of predicted parameters of the object during object generation;
the processor further configured to use the object shell to determine a relative placement of a plurality of unconnected objects to be manufactured in a common object generation operation.

7. Processing circuitry according to claim 6 wherein the processor is further configured to determine an object shell having at least a threshold thickness.

8. Processing circuitry according to claim 6 wherein the processor is further configured to analyse object model data representing an object to be generated by an additive manufacturing apparatus and to generate the property parameter model.

9. Processing circuitry according to claim 6 wherein the processor is further configured to determine the object shell based on a predetermined thermal diffusion function associated with a build material for use in generating the object.

10. Processing circuitry according to claim 6 wherein the processor is further configured to determine the object shell based on a predetermined property parameter gradient for at least one property associated with a print agent to be applied during object generation.

11. Processing circuitry according to claim 6 wherein the processor is further configured to determine a close packed relative placement of the plurality of unconnected objects having object shells such that the object shells do not overlap.

12. Processing circuitry according to claim 11 wherein the processor is further configured to determine control instructions to generate the plurality of unconnected objects having the close packed relative placement.

13. Processing circuitry according to claim 12 wherein the processor is further configured to control an object generation apparatus to generate the plurality of unconnected objects according to the control instructions.

14. A machine readable medium comprising instructions which, when executed by a processor, cause the processor to:
- analyse object model data representing a first object to be generated by an additive manufacturing apparatus;
- generate a thermal diffusion model associated with the first object during object generation;
- using the thermal diffusion model, generate a shell at least partially indicative of an intended minimum spacing of the first object from a second object, which is unconnected to the first object, in object generation; and
- determine, with reference to the shell, a relative placement of the first object and the second object to be manufactured in a common object generation operation.

* * * * *